United States Patent
Jann et al.

(10) Patent No.: US 7,613,535 B2
(45) Date of Patent: Nov. 3, 2009

(54) INDEPENDENT, SELF-CONTAINED, RISK ISOLATED, SECTIONAL CIM DESIGN FOR EXTREMELY LARGE SCALE FACTORY OPERATION

(75) Inventors: Larry Jann, Taipei (TW); Chien-Fei Cheng, Hsinchu (TW); I. Chun Chen, Jhongli (TW); Liang Po Hsiung, Jhongli (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 259 days.

(21) Appl. No.: 11/675,001

(22) Filed: Feb. 14, 2007

(65) Prior Publication Data
US 2008/0109096 A1    May 8, 2008

Related U.S. Application Data

(60) Provisional application No. 60/864,930, filed on Nov. 8, 2006.

(51) Int. Cl.
*G06F 19/00*    (2006.01)

(52) U.S. Cl. .................. 700/96; 700/121; 700/99; 700/113

(58) Field of Classification Search ............... 700/96, 700/121, 99, 112, 113, 115, 116
See application file for complete search history.

(56) References Cited

U.S. PATENT DOCUMENTS

| | | | |
|---|---|---|---|
| 6,684,121 B1* | 1/2004 | Lu et al. | 700/108 |
| 2002/0165629 A1* | 11/2002 | Ho et al. | 700/82 |
| 2005/0240298 A1* | 10/2005 | Ni et al. | 700/99 |
| 2006/0079978 A1* | 4/2006 | Chi et al. | 700/96 |
| 2007/0061034 A1* | 3/2007 | Puri et al. | 700/112 |

* cited by examiner

*Primary Examiner*—Ramesh B Patel
*Assistant Examiner*—Steven R Garland
(74) *Attorney, Agent, or Firm*—Haynes and Boone, LLP (57) ABSTRACT

A semiconductor manufacturing system includes a centralized computer integrated manufacturing (CIM) system; a plurality of sectional CIM systems respectively associated with a plurality of manufacturing facilities and coupled with the centralized CIM system; and a centralized basic record module, coupled and coordinated with the centralized CIM system, and designed for defining a unified process flow associated to a mobile object.

11 Claims, 10 Drawing Sheets

INDEPENDENT, SELF-CONTAINED, RISK ISOLATED, SECTIONAL CIM DESIGN FOR EXTREMELY LARGE SCALE FACTORY OPERATION

CROSS REFERENCE

This application claims priority to U.S. Patent Application Ser. No. 60/864,930 filed on Nov. 8, 2006 which is hereby incorporated by reference.

BACKGROUND

A semiconductor integrated circuit (IC) company, such as a semiconductor wafer foundry, provides various IC manufacturing services to customers, through a plurality of manufacturing sites (e.g., fabs). When an object such as a lot (a batch of wafer in process) is transferred from one manufacturing site to another, cross-facility operations require various processing steps.

For example, engineers from an original, requesting fab need to communicate and coordinate with engineers from a backup, support fab in order to define important configuration parameters such as backup tool and process flow, recipes, data collection items, and other important parameters. Manufacturing users in the support fab need to register the target lot into a backup control system, and make sure the backup transition can be completed at the support fab. This conventional cross-facility approach costs additional manufacturing effort and resources, such as on communication and process flow mapping when a backup event is triggered.

Further, the current backup approach can introduce other problems. For example, a lot identification (ID) may be changed when the lot is transferred to the support fab for compliance to the standard of the support fab. Several items associated with the lot such as the future hold, schedule change reservation, and pre-dispatch reservation cannot perform proper backup because of the absence of proper cross-facility coordination. Also, the backup fab cannot provide another support fab for further backup. Furthermore, operation history of the lot in the support fab cannot be properly transferred back to the request fab.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
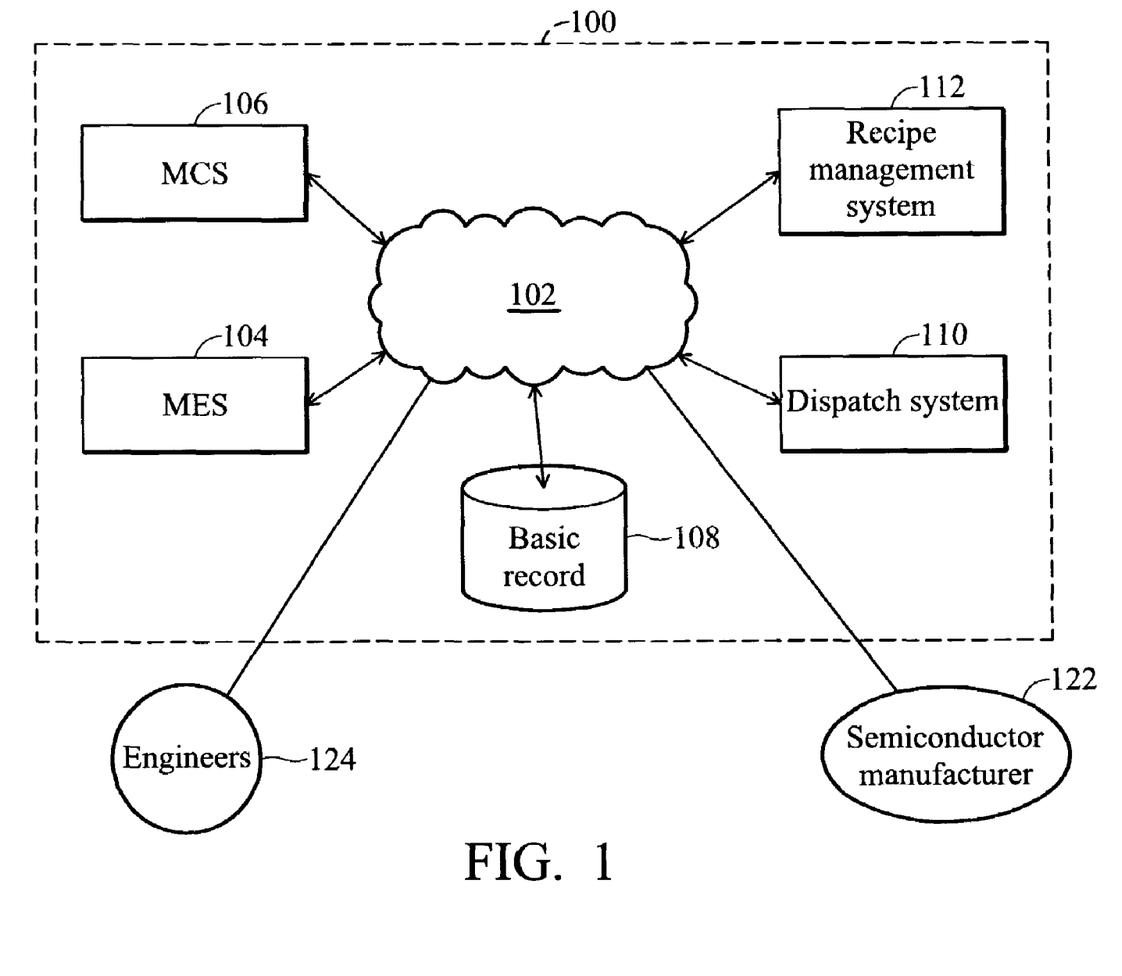
FIG. 1 is a block diagram of an embodiment of a computer integrated manufacturing (CIM) system constructed according to the aspects of the present disclosure.

FIG. 1 is a block diagram of an embodiment of a computer integrated manufacturing (CIM) system 100 constructed according to the aspects of the present disclosure. A CIM system provides a complete automation of manufacturing fabs, with all processes functioning under computer control. The CIM system 100 includes various components coupled together through a network 102 such as an intranet or the Internet. The CIM system 100 includes a manufacturing execution system (MES) 104 designed for overseeing the manufacture of semiconductor products, assigning inventory, moving inventory, scheduling tools, and other proper tasks. The CIM system 100 also includes a material control system (MCS) 106 designed for controlling material transportation and other material handling among process tools and/or among manufacturing sites. The CIM system 100 includes a basic record (BR) 108 that is a centralized system for defining a unified process flow (also referred to as process flow definition system, or PFDS). The BR 108 may be designed additionally for defining a portable data package to a mobile object such as a wafer. The CIM system 100 further includes a dispatch system 110 designed for dispatching products and other mobile objects among processing tools and manufacturing sites or facilities. The CIM system 100 further includes recipe management system 112 designed for managing and maintaining various processing recipes associated with various processing tools and various products. The CIM system 100 may further include other components for managing, coordinating, and maintaining various manufacturing tools, products, processing recipes, material control, and other manufacturing related tasks. For example, the CIM system 100 may further include a database for keeping and maintaining various manufacturing related information such as wafer or lot history, tool history, work-in-progress, and yield data.

The CIM system 100 is coupled to and communicates with a semiconductor manufacturer 122 through the network 102. The semiconductor manufacturer 122 may include a plurality of manufacturing facilities, locations, sites, or entities (referred to generically as facilities) such as wafer fabs and/or reticle workshops. The CIM system 100 includes a centralized CIM system and one or more sectional CIM systems, each integrated with and associated with a manufacturing facility.

Various users such as engineers 124 may be in communication with the CIM system 100 through terminals such as a computer or a process tool. Other uses may include manufacturing operators and customers. The centralized BR 108 defines a unified process flow and a mechanism for cross-facility backup support for semiconductor manufacturing including wafer and reticle fabrications.

Figure 2:
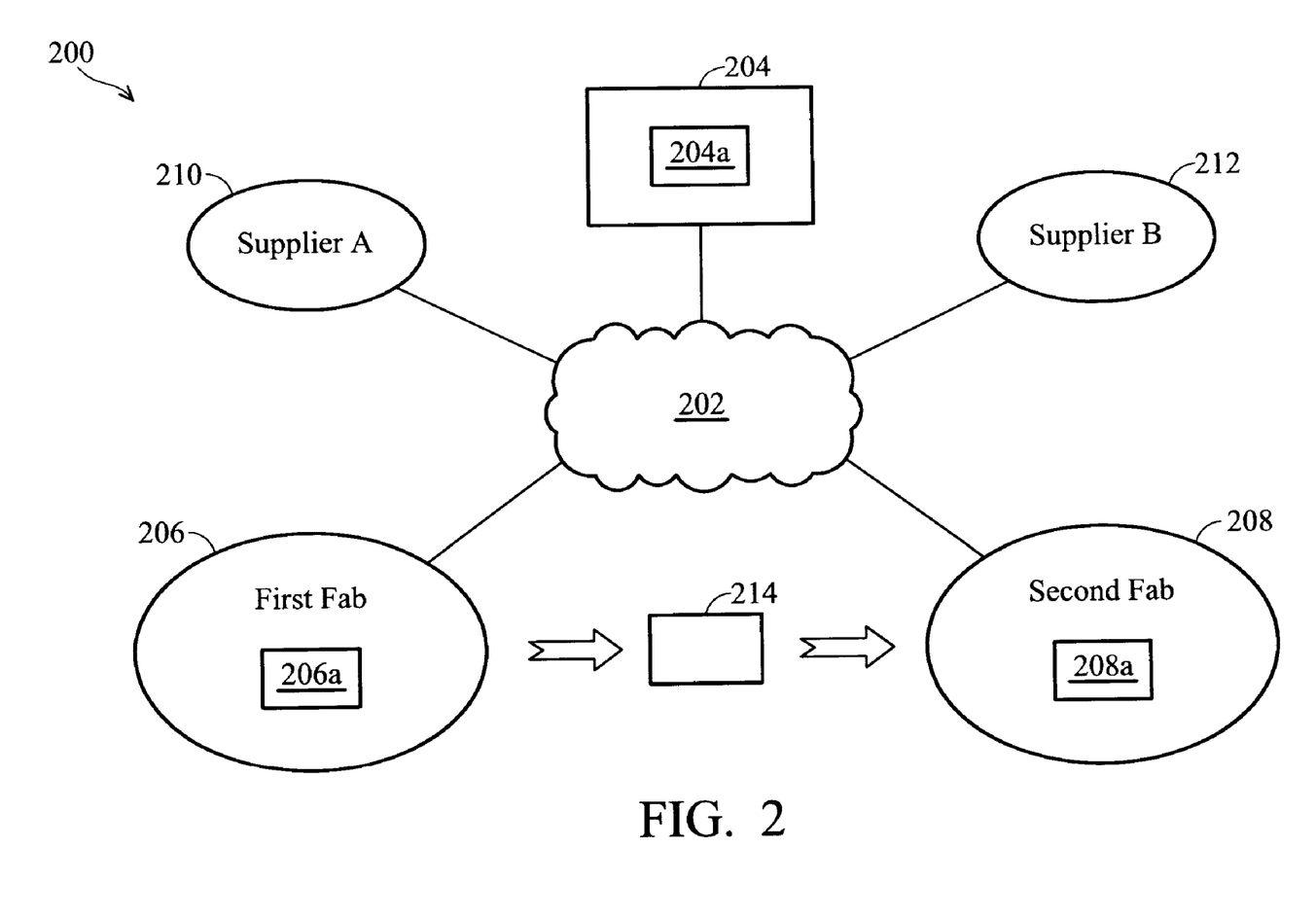
FIG. 2 is a block diagram of an embodiment of a semiconductor manufacturing company with multiple facilities (e.g. fabs) integrated with the CIM system of FIG. 1.

FIG. 2 is a block diagram of an embodiment of a semiconductor manufacturer 200 integrated with the CIM system of FIG. 1. The semiconductor manufacturer 200 includes a plurality of manufacturing facilities. In the present embodiment, the semiconductor manufacturer 200 includes two exemplary fabs: a first fab 206 and a second fab 208. The first fab 206 includes a sectional CIM system 206a integrated with and managing wafer manufacturing in the first fab 206. Similarly, the second fab 208 includes a sectional CIM system 208a integrated with and managing wafer manufacturing in the first fab 206. The semiconductor manufacturer 200 may further include other manufacturing facilities such as supplier A 210 and supplier B 212. The suppliers A and B may include an automatic material handling system (AMHS) designed with various vehicles to move materials such as wafer lots among processing tools and facilities. In one embodiment, the supplier A 210 includes an AMHS integrated in the first fab 206 and the supplier B 212 includes an AMHS integrated in the second fab 208. The semiconductor manufacturer 200 also includes a centralized CIM system 204. The centralized CIM 204 includes a centralized process flow definition system 204a (PFDS or referred to as basic record) to define a unified process flow among all manufacturer entities. The centralized CIM system 204 and the all manufacturing facilities are coupled and in communication and coordination through a network 202.

For the sake of further example, a mobile object 214 is transferable from the first fab 206 to the second fab 208 for manufacturing backup. As further illustrated in FIG. 3, the mobile object 214 can include a wafer lot 302, a reticle 304, a wafer carrier 306, a reticle pod 308, or combinations thereof. The mobile object 214 can alternatively be a machine or fixture 310 utilized in semiconductor fabrication. The mobile object 214 also includes a unified process flow 312 defined by the centralized PFDS 204a. The unified process flow is applicable to all manufacturing facilities including the first fab 206 and the second fab 208 for its processing therein. The unified process flow further includes processing steps, processing tools in each manufacturing fab and associated to each processing step, and also associated processing recipes associated with each processing tool. For example, a unified process flow for the mobile object 214 may include a processing step SI (such as a thin film deposition processing step). The thin film deposition processing step includes processing tools A1 and A2 in the first fab 206 and processing tools B1, B2, and B3 in the second fab 208. The thin film deposition processing step also includes a processing recipe R1 applicable to all associated processing tools. Alternatively, the thin film deposition processing step may include various processing recipes each associated with particular processing tools or particular manufacturing fabs. The thin film deposition processing step may further include processing recipes and processing tools associated with other manufacturing fabs. The unified process flow is predefined for the mobile object and is associated therewith during manufacturing process and cross-facility backup support.

Figure 3:
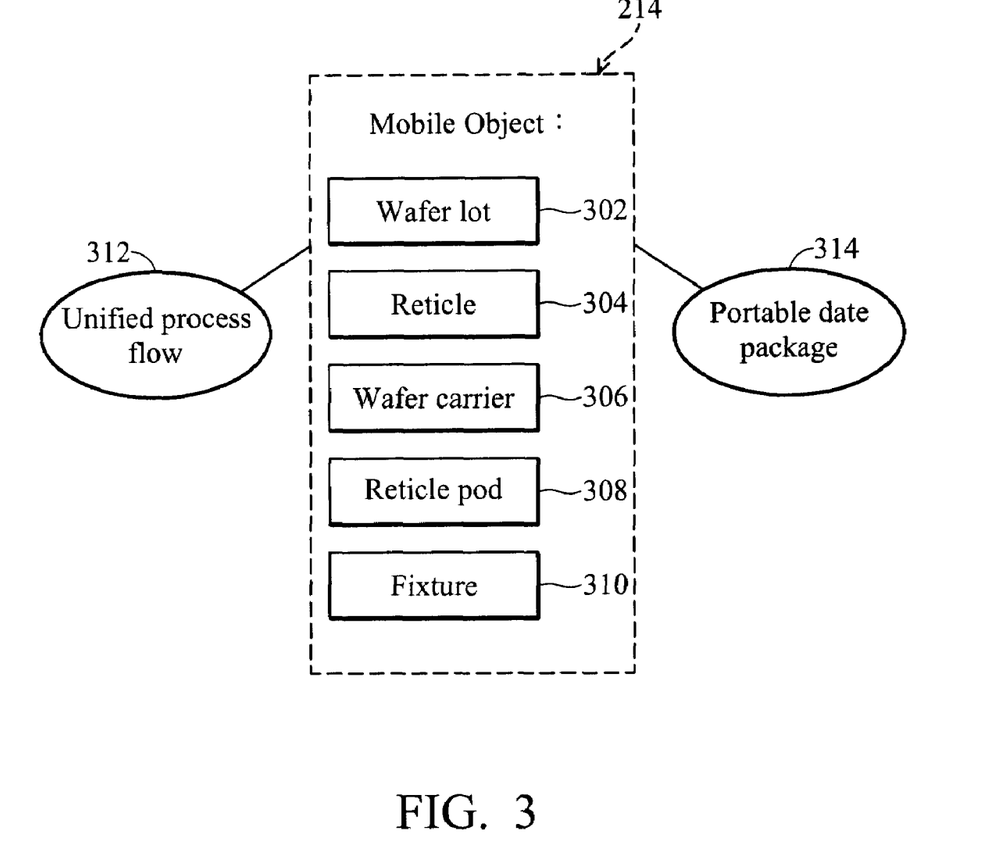
FIG. 3 is a block diagram of various embodiments of a mobile object associated with a unified process flow and a portable data package.

The mobile object 214 also includes a portable data package (or data package) 314 defined by the PFDS 204a or other proper component of the centralized CIM 204 or by a sectional CIM system such as sectional CIM system 206a associated with the first fab 206 with coordination of the centralized CIM system 204. The portable data package 314 may include the mobile object ID, status, history and other manufacturing related parameters and information. In one embodiment of a wafer lot as the mobile object, the portable data package may include lot status, wafers in the lot, wafer processing history, process flow, future lot/wafer hold, hold record, Qtime (waiting time between processing steps), notes, and comments such as a special engineer request. In one embodiment of a wafer carrier as the mobile object, the portable data package may include status, contained lot, contained wafers, and other carrier related information. In one embodiment of a reticle as the mobile object, the portable data package may include reticle status, group relation, and other reticle related parameters and information. In further embodiment of a reticle-pod as the mobile object, the portable data package may include reticle pod status, contained reticles, and other reticle-pod related parameters and information. The portable data package 314 is predefined for the mobile object 214 during manufacturing process and cross-facility backup support.

Referring back to FIG. 2, when the mobile object 214 is transferred from the first fab 206 to the second fab 208, the portable data package can be automatically transferred from the sectional CIM system 206a to the sectional CIM system 208a with coordination of the centralized CIM system 204.

The semiconductor manufacturer 200 may additionally include a "firebreak" between each and every two manufacturing facilities. The firebreak design provides a protection to the manufacturing system such that a server cannot directly access a remote site database. Instead, the needed remote data is first transferred to a local database and is accessed by the server. Furthermore, by building in the firebreak, a server cannot directly send a transaction to a remote site server. Instead, the request is first passed to another system, which then sends the request to the remote site server.

In one embodiment, when the mobile object 214 is moved through various processing steps in one manufacturing facility, there is a particular process flow associated with the mobile object and that manufacturing facility. The particular process flow defines specifically the mobile object processing route and processing tools and processing recipes for each processing step. When the mobile object is transferred to another fab, engineers in the request fab need to communicate with engineers in the support fab and create relevant process flows and recipes, select suitable processing tools in the support fab, and further create a data package for the mobile object to the support fab. Various issues and cost may be introduced. In other embodiments discussed further below the CIM system 100, the semiconductor manufacturer 200, and the method provide a mechanism for transferring a mobile object independently, self-contained, risk isolated cross-facility backup support with reduced transferring issues mentioned above.

Figure 4:
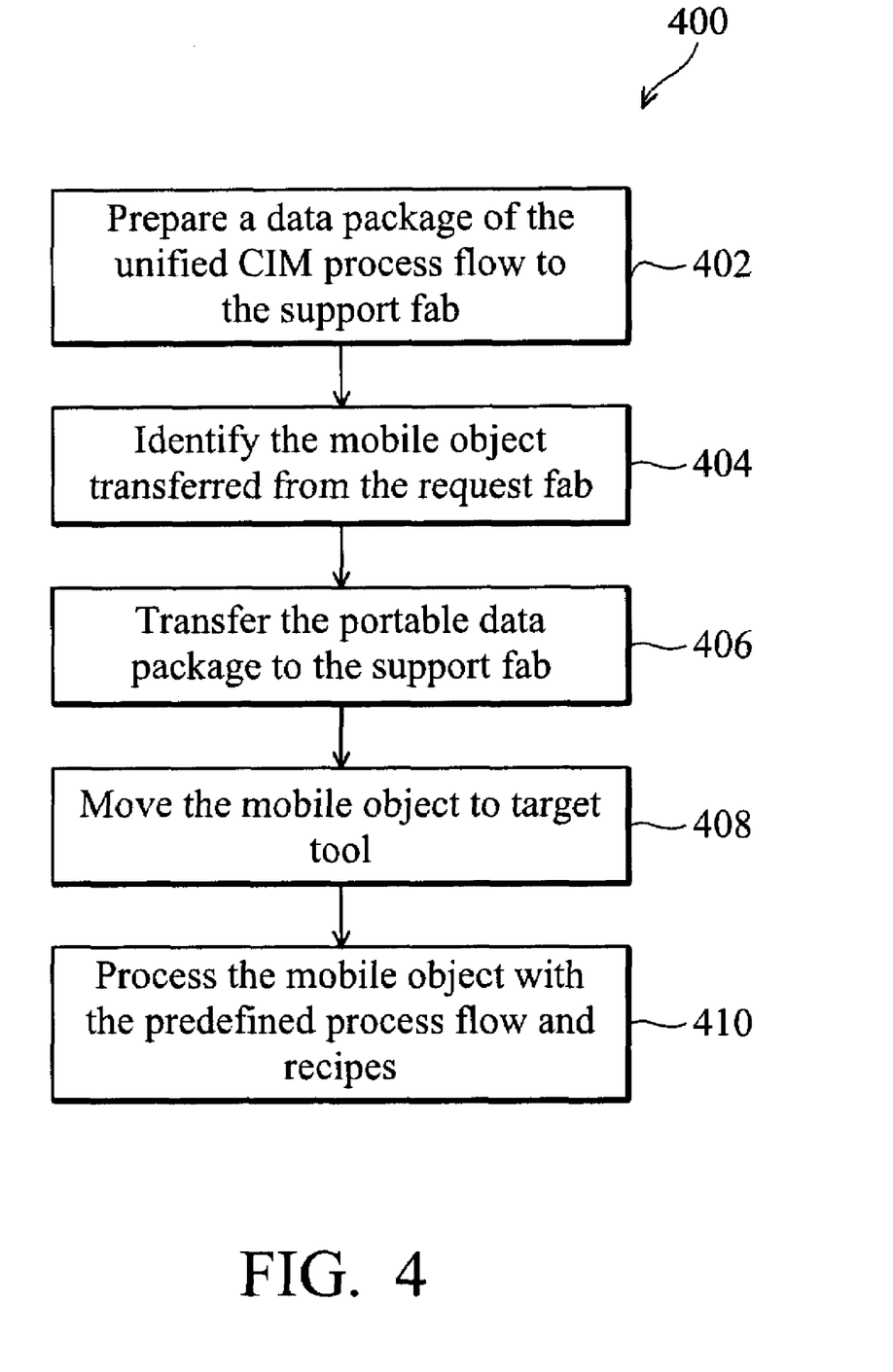
FIG. 4 is a flowchart of an embodiment of a method to implement cross-facility backup capability constructed according to aspects of the present disclosure.

Referring also to FIG. 4, a "place and run" method 400 implements cross-facility backup capability to a mobile object. The method 400 may be performed by the CIM system 100 or the semiconductor manufacturer 200 with integrated CIM system. For the sake of further example, a wafer carrier will be used as the mobile object.

The method 400 begins by a request facility (such as the first fab 206) preparing a data package of a predefined unified process flow for the mobile object to a support facility (such as the second fab 208) through a centralized CIM system (such as the centralized CIM system 204). A remote wafer carrier stock-in process will be initiated thereby to transfer the wafer carrier from the request fab and the sectional CIM system of the support fab will be instructed to follow up. The method 400 then proceeds to step 404 in which the sectional CIM system of the support fab identifies that the wafer carrier is coming from the request fab.

At step 406, the sectional CIM system of the request fab transfers the data package of the wafer carrier to the sectional CIM system of the support fab after the identification thereof, through the centralized CIM system.

At step 408, the support fab's AMHS delivers the wafer carrier to the target tool in the support fab under the instruction by the dispatch system in the sectional CIM system of the support fab. The method 400 then proceeds to step 410 in which the wafer carrier may be processed in the target tool with an associated recipe in a predefined process flow. In one example, wafers contained in the wafer carrier may be processed with an associated recipe in the target tool and may move for further process according to the predefined unified process flow.

Figure 5:
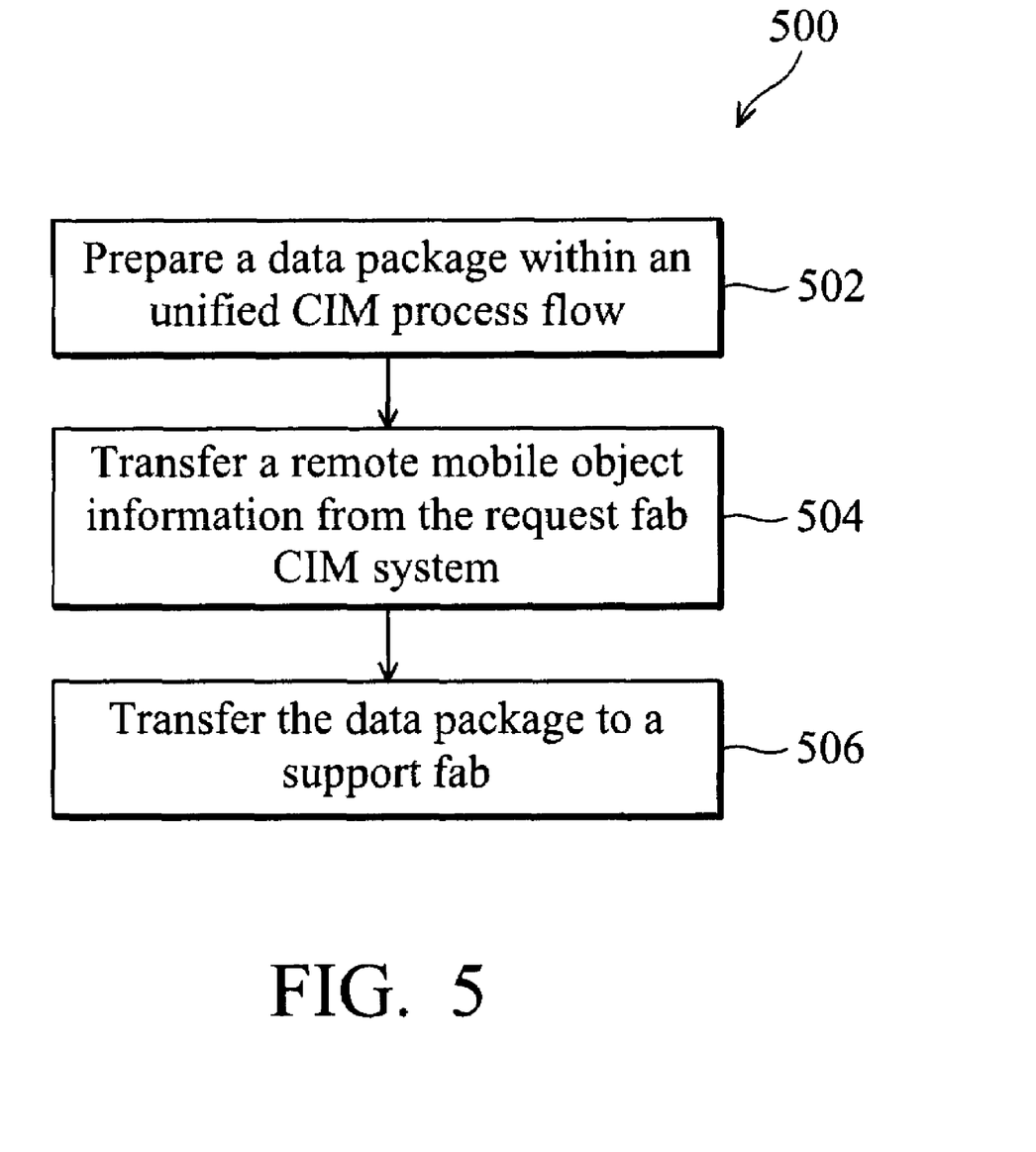
FIG. 5 is a flowchart of an embodiment of a method to implement cross-facility backup capability constructed according to aspects of the present disclosure.

FIG. 5 illustrates a method 500 constructed according to another embodiment of the present disclosure. At step 502, at least one data package within a unified CIM process flow is prepared by at least one request fab to at least one support fab data joiner. The data joiner includes a reporting mechanism, electrical document control application, and data package integration. The method 500 proceeds to step 504 by transmitting a remote wafer carrier information from the CIM system of the request fab. At least one support fab will identify the wafer carrier information from the request fab.

At step 506, the data package is transmitted within the unified CIM process flow to the support fab from the request fab CIM system. During or after this step, the support fab will execute a predetermined process flow with the data package when the support fab has an available capacity for manufacturing support. The centralized CIM system can perform balance fine-tune task when the capacity of the support fab is not available.

One or more advantages exist in various embodiments described above. For example, a large semiconductor manufacturer may properly enhance efficiency and capacity with the sectional CIM system constructed according to aspects of the present disclosure and enhances coordination and cross-facility support among various fabs in the semiconductor manufacturer. The semiconductor manufacturer may employ this system to build business model of new service.

The present disclosure may also have various alternatives and embodiments. For example, manufacturing fabs and processing steps illustrated above only serve as examples and are not intended to be limiting. The CIM system may further include other components, functions, and configurations for enhancing semiconductor manufacturer capacity, flexibility, and integration.

Figure 6:
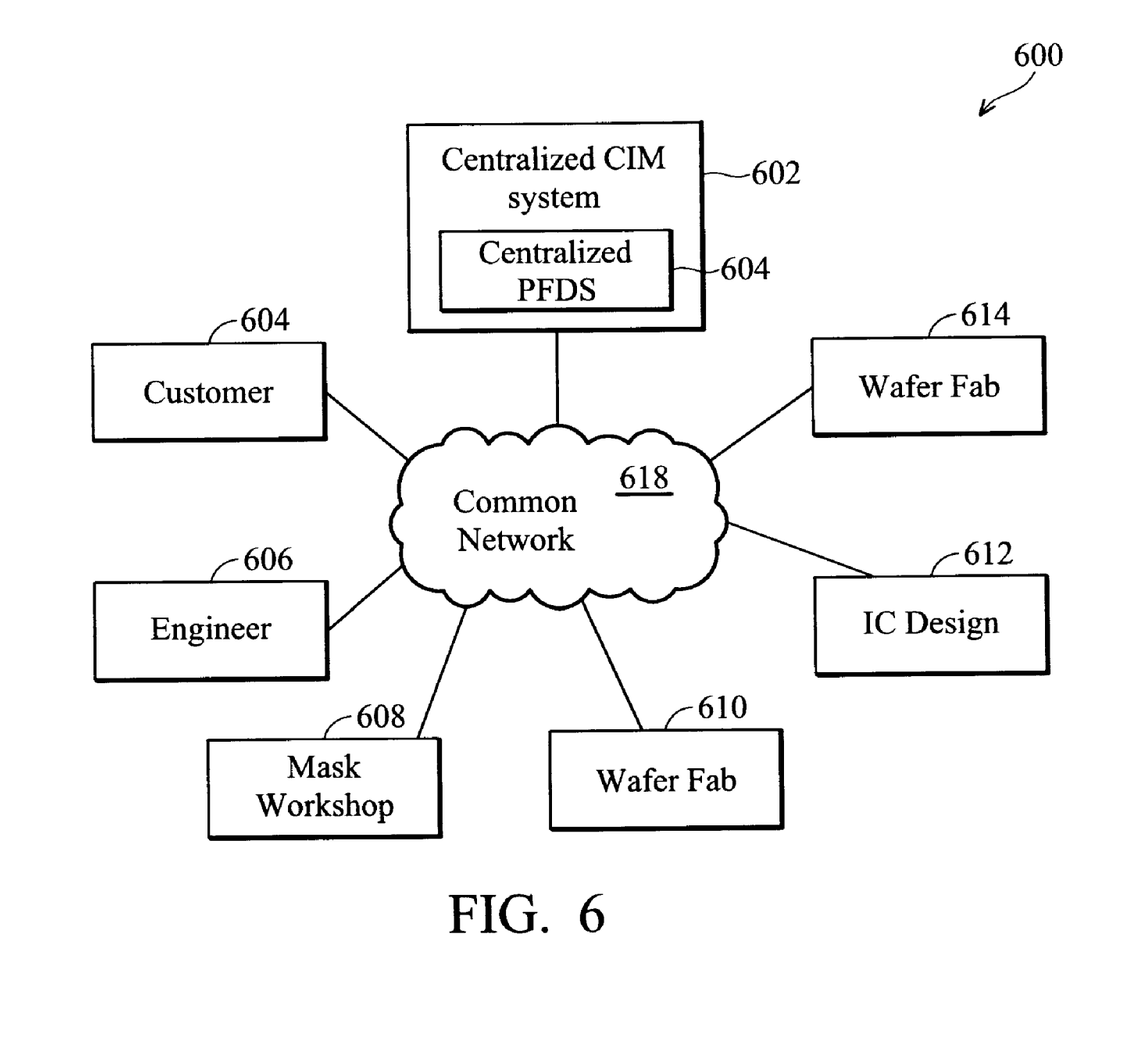
FIG. 6 is a block diagram of a semiconductor manufacturer constructed according to aspects of the present disclosure.
Figure 7:
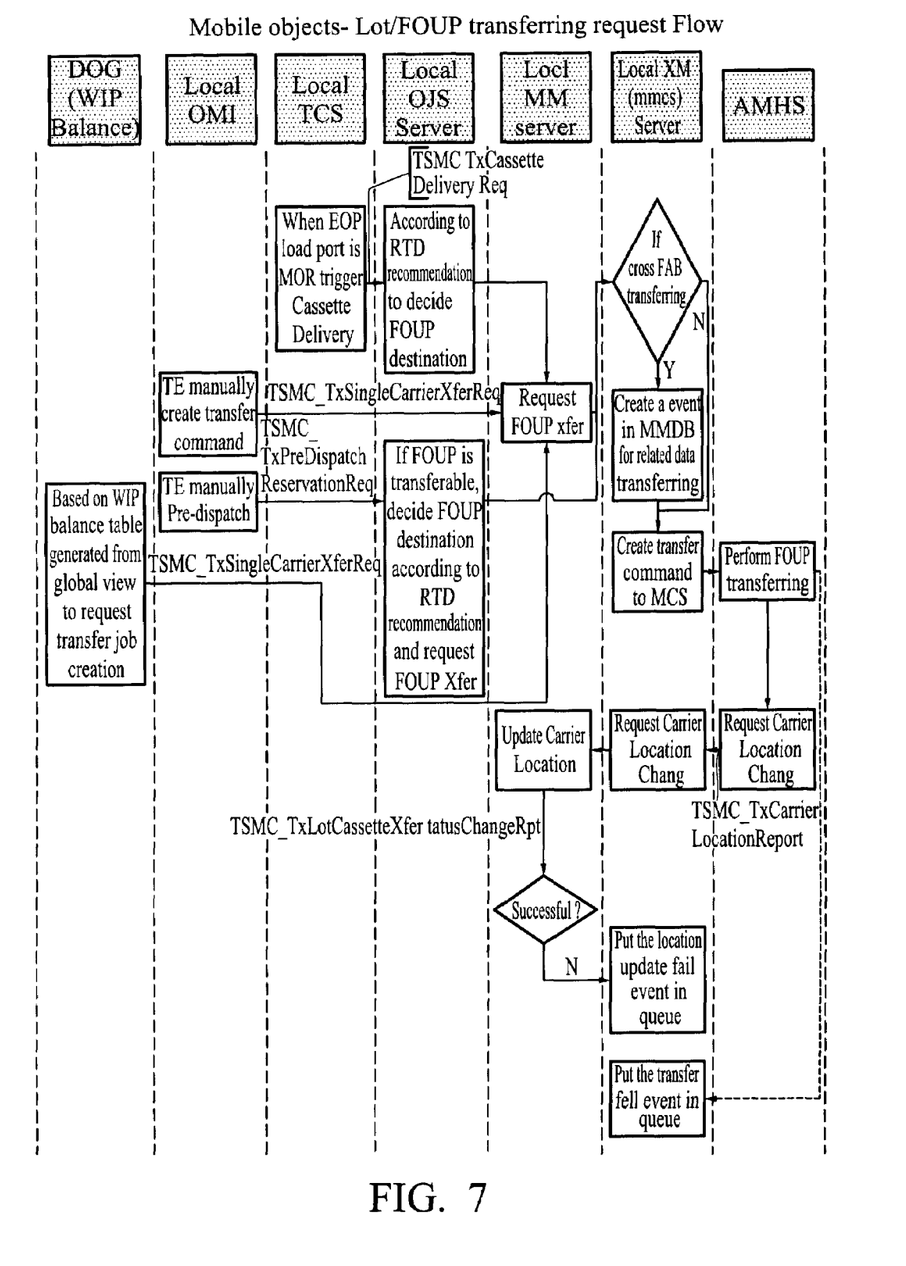
FIGS. 7 through 10 illustrate various embodiments of a transfer process for a wafer carrier as a mobile object, a work-in-progress (WIP) balancing process among various manufacturing sites, and a mobile object transfer process constructed according to aspects of the present disclosure.
Figure 8:
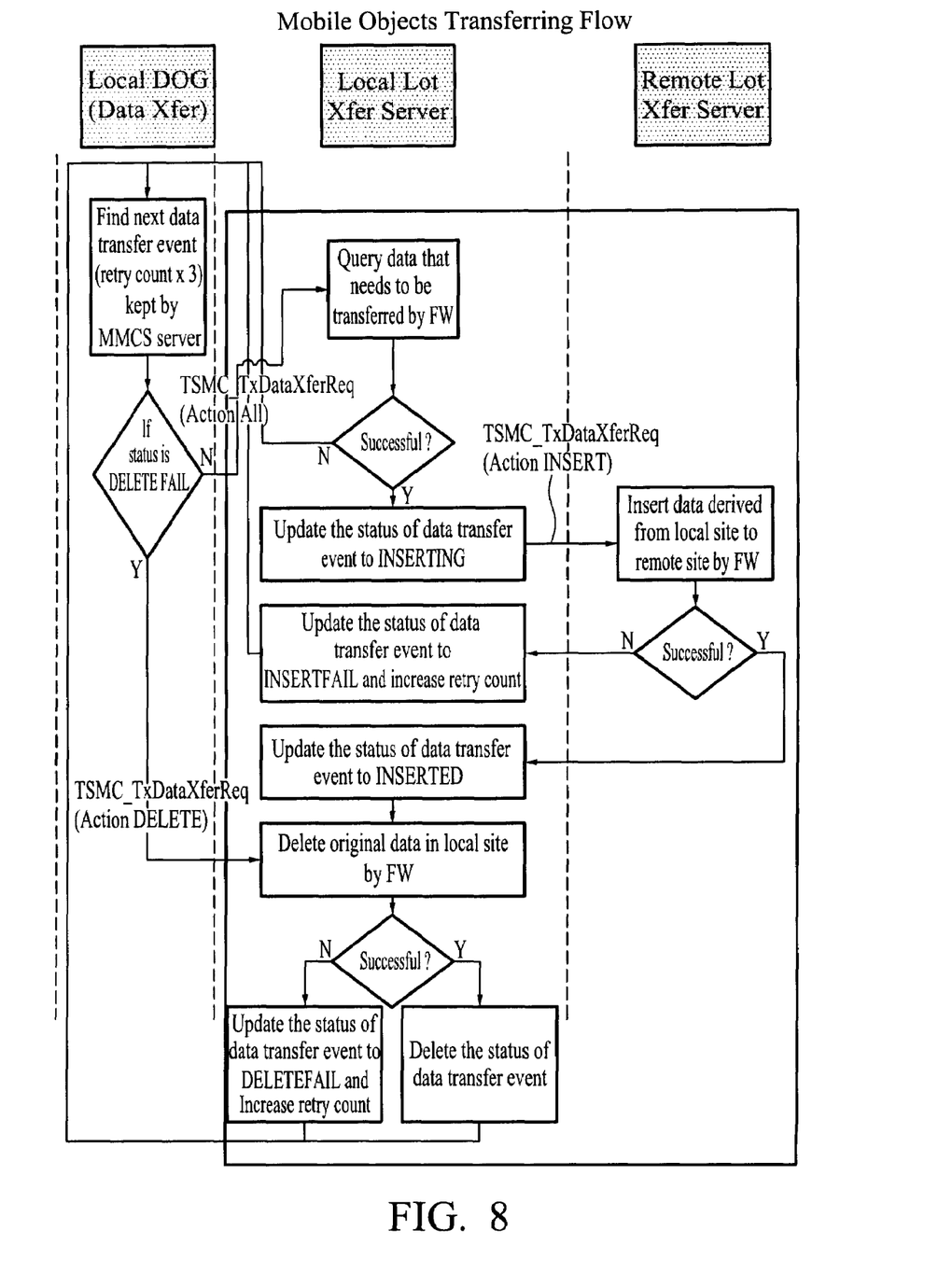
Figure 9:
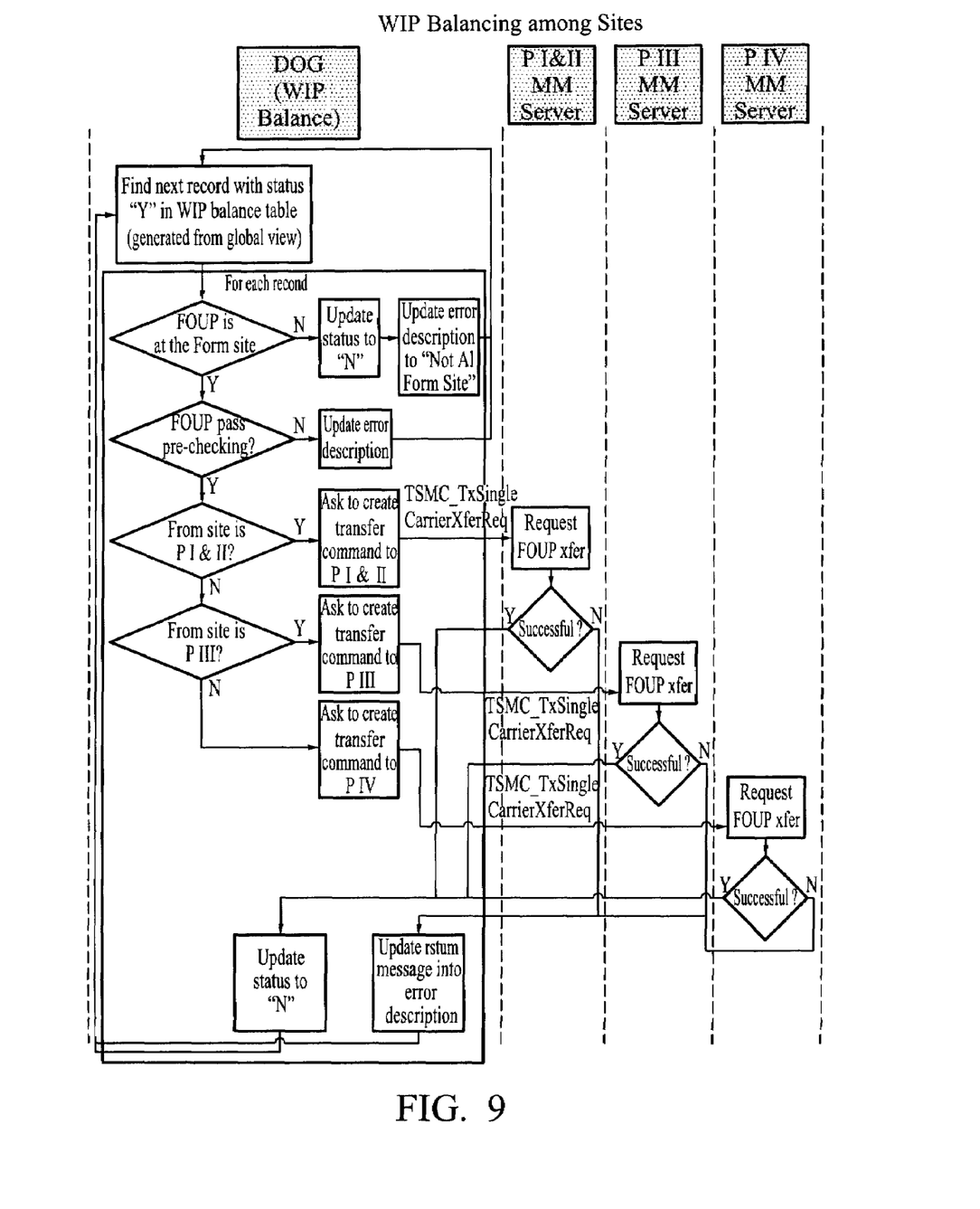
Figure 10:
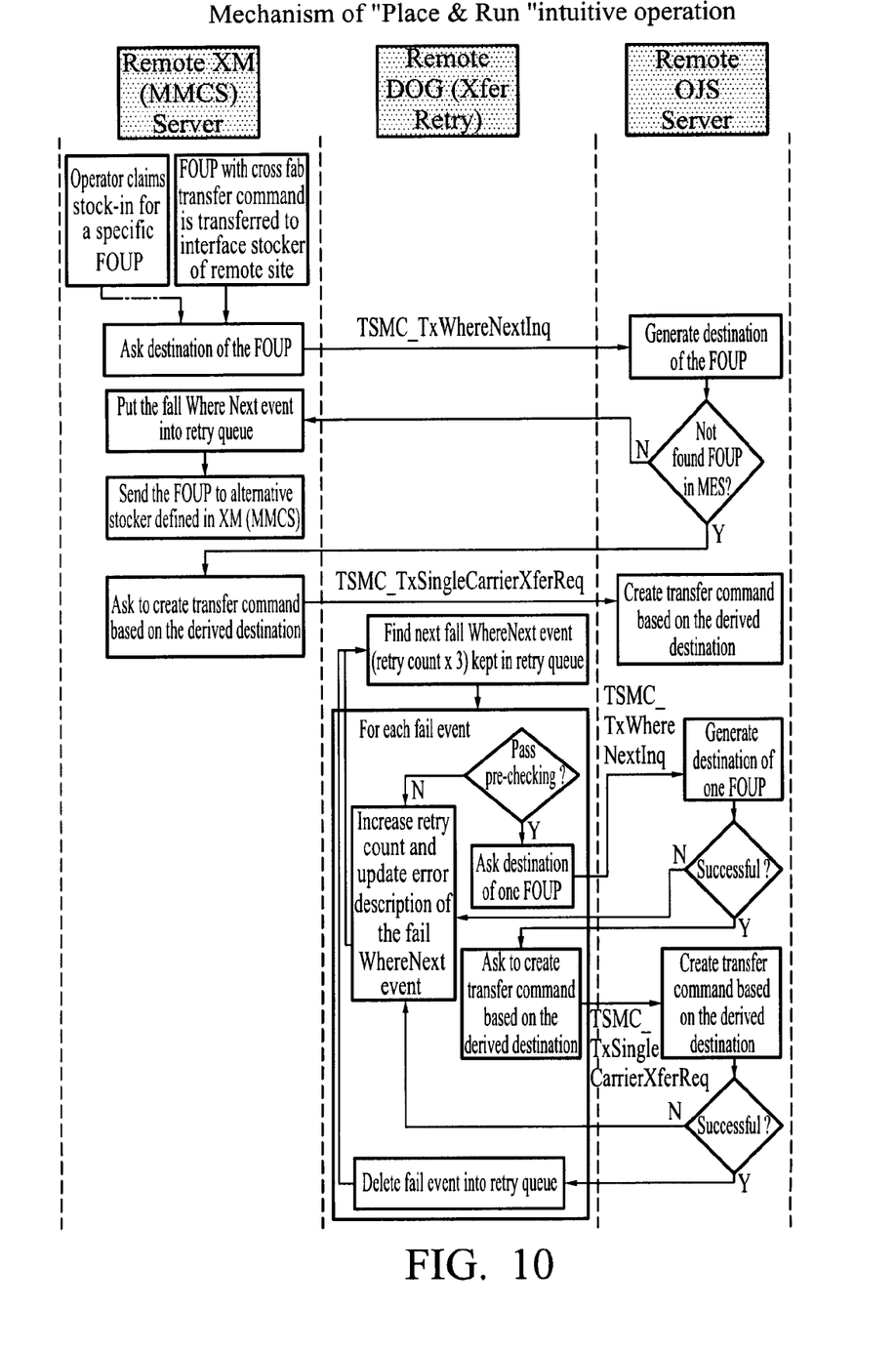

FIG. 6 is a block diagram of a semiconductor manufacture 600 in one embodiment. The semiconductor manufacturer 600 includes various entities coupled to a common network 618 such as an intranet or the Internet. The semiconductor manufacturer 600 includes a centralized computer integrated manufacturing (CIM) system 602, which is substantially similar to the CIM system 100 in term of function. The CIM system 602 includes a centralized process flow definition system (PFDS) 604 for defining a unified process flow and may be designed additionally for defining a portable data package to a mobile object such as a wafer. Furthermore, the CIM system 602 includes a manufacturing execution system (MES), designed for overseeing the manufacture of semiconductor products, assigning inventory, moving inventory, scheduling tools, and other proper tasks. The CIM system 602 also includes a material control system (MCS) designed for controlling material transportation and other material handling among process tools and/or among manufacturing sites. The CIM system 602 further includes a dispatch system designed for dispatching products and other mobile objects among processing tools and manufacturing sites or facilities. The CIM system 602 further includes recipe management system designed for managing and maintaining various processing recipes associated with various processing tools and various products. The CIM system 602 may further include other components for managing, coordinating, and maintaining various manufacturing tools, products, processing recipes, material control, and other manufacturing related tasks. For example, the CIM system 602 may further include a database for keeping and maintaining various manufacturing related information such as wafer or lot history, tool history, work-in-progress, and yield data. The semiconductor manufacturer 600 may additionally include one or more sectional CIM systems, each integrated with and associated with the semiconductor manufacturer 600.

The semiconductor manufacturer 600 includes an exemplary customer utilizing thereof for its products and other purposes. The semiconductor manufacturer 600 includes a plurality of engineers, technicians, and/or operators 606 to utilize and control the semiconductor manufacturer. The semiconductor manufacturer 600 may include a mask shop 608 for fabricating photomasks (or reticles) for wafer patterning. The semiconductor manufacturer 600 includes a wafer fab 610 for fabricating various integrated circuits (IC) wafers. The semiconductor manufacturer 600 may include an IC design 612 for designing various IC products to be fabricated therein. The semiconductor manufacturer 600 may include an additional wafer fab 614 for IC wafer fabrication.

FIGS. 7 through 10 illustrate various embodiments of a transfer process for a wafer carrier as a mobile object, a work-in-progress (WIP) balancing process among various manufacturing sites, and a mobile object transfer process, respectively, constructed according to aspects of the present disclosure. DOG refers to a watchdog program for monitoring WIP. OMI refers to an operator management interface. TCS refers to a tool control system. OJS refers to an operator job supervisor. MM server refers to a material management server. XM server refers to a transfer management server.

Thus, the present disclosure provides a semiconductor manufacturing system. The system includes a centralized computer integrated manufacturing (CIM) system; a plurality of sectional CIM systems each associated with one of a plurality of manufacturing facilities and coupled with the centralized CIM system; and a centralized basic record module, coupled with the centralized CIM system, and having a predefined unified process flow to a mobile object.

In this system, the mobile object is further associated with a portable data package. The mobile object with the portable data package is transferable among the plurality of manufacturing facilities. The mobile object may include a wafer, a wafer lot, a wafer carrier, a reticle, a reticle pod, a fixture, and/or a combination thereof. One or more of the manufacturing facilities in the system may be a wafer fab and a reticle workshop. The centralized CIM system may include a manufacturing execution system; a recipe management system; a dispatch system; and an automatic material handling system. The centralized CIM system may include a mechanism for providing a remote access and instructing manufacturing capacity balance. The plurality of manufacturing facilities may include a request entity and a support entity during a backup event of transferring the mobile object from the request entity to the support entity. One of the plurality of sectional CIM system associated with the request entity and another one associated with the support entity provide a mechanism for transferring the mobile object information and executing a predefined process flow. The centralized CIM system comprises a computer integrated semiconductor process system designed to enable cross-facility operation.

The present disclosure also provides a method for integrated CIM data package and backup support. The method includes preparing a data package within a unified process flow associated with a mobile object by a request fab; transmitting mobile object stock-in information from a sectional CIM system associated with the request fab to a support fab; identifying the mobile object stock-in information by a second sectional CIM system associated with the support fab; transmitting the data package to the support fab; and executing a predefined process flow associated with the data package.

The disclosed method may further include performing a balance fine-tune task by a centralized CIM system. The data package may include a set of data such as lot package information, carrier package information, reticle package information, reticle pod package information, the predefined process flow, and combinations thereof. The unified process flow may include a tool process package associated with the mobile object. The preparing a data package may include preparing the data package to a data joiner of the support fab. The data joiner may include a reporting mechanism, an electrical document control application, and data package integration. The executing a predefined process flow may include executing transferring of the mobile object to a target tool by an automatic material handing system.

The present disclosure also provides another embodiment of a semiconductor manufacturing system. The system includes a centralized CIM system; a first sectional CIM system associated with a request fab and coupled with the centralized CIM system; a second sectional CIM system associated with a support fab and coupled with the centralized CIM system; and a centralized process flow definition system (PFDS), coupled with the centralized CIM system and designed for defining a unified process flow associated with a mobile object transferable between the request fab and the support fab.

In this system, the centralized PFDS may be designed for defining a data package and a tool process flow associated with the mobile object. The centralized CIM system provides a mechanism for balancing manufacturing capacity.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A semiconductor manufacturing system, comprising:
   a centralized computer integrated manufacturing (CIM) system;
   a plurality of sectional CIM systems each associated with one of a plurality of manufacturing facilities and coupled with the centralized CIM system, wherein the plurality of manufacturing facilities includes a request entity and a support entity, wherein the support entity provides manufacturing backup for the request entity; and
   a centralized basic record module included in the centralized CIM system, and having a predefined unified process flow for use by a mobile object that is transferred between the request entity and the support entity; and wherein the unified process flow defines a first processing step, and wherein the unified process flow further defines a first set of tools to perform the first processing step at the request entity and a second set of tools to perform the first processing step at the support entity.

2. The system of claim 1, wherein the mobile object is further associated with a portable data package.

3. The system of claim 2, wherein the mobile object with the portable data package is transferable among the plurality of manufacturing facilities.

4. The system of claim 1, wherein the mobile object comprises at least one object selected from the group consisting of a wafer, a wafer lot, a wafer carrier, a reticle, a reticle pod, and a fixture.

5. The system of claim 1, wherein at least one of the plurality of manufacturing facilities is a wafer fab.

6. The system of claim 1, wherein the centralized CIM system comprises:
   a manufacturing execution system;
   a recipe management system;
   a dispatch system; and
   an automatic material handling system.

7. The system of claim 1, wherein the centralized CIM system comprises a mechanism for providing a remote access and balancing manufacturing capacity.

8. The system of claim 7, wherein the centralized CIM system comprises a computer integrated semiconductor process system designed to enable cross-facility operation.

9. The system of claim 1, wherein one of the plurality of sectional CIM systems is associated with the request entity and another one associated with the support entity provide a mechanism for transferring the mobile object and executing a predefined process flow defined by the uniform process flow.

10. The system of claim 1, wherein the centralized CIM system provides a mechanism for balancing manufacturing capacity.

11. The system of claim 1, wherein the mobile object comprises at least one object selected from the group consisting of a reticle, a reticle pod, and a fixture.

* * * * *